(12) United States Patent
Kim et al.

(10) Patent No.: US 8,070,929 B2
(45) Date of Patent: *Dec. 6, 2011

(54) CATALYST PARTICLES ON A TIP

(75) Inventors: Yong Hyup Kim, Seoul (KR); Wal Jun Kim, Seoul (KR)

(73) Assignee: SNU R&DB Foundation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/196,092

(22) Filed: Aug. 21, 2008

(65) Prior Publication Data

US 2010/0048391 A1    Feb. 25, 2010

(51) Int. Cl.
| | |
|---|---|
| C25D 5/00 | (2006.01) |
| C25D 5/02 | (2006.01) |
| B05D 1/04 | (2006.01) |
| B05D 1/36 | (2006.01) |
| C23C 4/08 | (2006.01) |
| C23C 16/00 | (2006.01) |
| H05C 1/00 | (2006.01) |

(52) U.S. Cl. .......... 205/80; 205/118; 205/119; 427/458; 427/456; 427/470; 427/473; 427/249.1; 977/722; 977/742

(58) Field of Classification Search .................. 502/321; 977/722

See application file for complete search history.

(56) References Cited

U.S. PATENT DOCUMENTS

| | | | | |
|---|---|---|---|---|
| 3,223,600 | A | * | 12/1965 | Andersson ...................... 205/97 |
| 4,326,989 | A | * | 4/1982 | Colon et al. .................. 502/162 |
| 4,498,962 | A | * | 2/1985 | Oda et al. ...................... 205/632 |
| 5,132,002 | A | * | 7/1992 | Kato .............................. 204/416 |
| 6,635,311 | B1 | | 10/2003 | Mirkin et al. |
| 6,743,408 | B2 | * | 6/2004 | Lieber et al. ................ 423/447.1 |
| 7,014,749 | B2 | | 3/2006 | Redepenning |
| 7,022,541 | B1 | | 4/2006 | Yenilmez et al. |
| 7,045,947 | B2 | | 5/2006 | Van Der Vaart et al. |
| 2002/0046953 | A1 | | 4/2002 | Lee et al. |
| 2002/0182970 | A1 | * | 12/2002 | Liu et al. ......................... 445/51 |
| 2003/0157254 | A1 | | 8/2003 | Mirkin et al. |
| 2004/0173378 | A1 | | 9/2004 | Zhou et al. |
| 2005/0272885 | A1 | | 12/2005 | Mirkin et al. |
| 2007/0007142 | A1 | * | 1/2007 | Zhou et al. ....................... 205/78 |
| 2007/0014148 | A1 | | 1/2007 | Zhou et al. |
| 2007/0025907 | A1 | * | 2/2007 | Rezeq et al. ................ 423/447.3 |
| 2007/0082459 | A1 | | 4/2007 | Faris |
| 2007/0221840 | A1 | | 9/2007 | Cohen et al. |
| 2008/0280137 | A1 | | 11/2008 | Ajayan et al. |

(Continued)

FOREIGN PATENT DOCUMENTS

EP        1061041 A1     12/2000

(Continued)

OTHER PUBLICATIONS

Lee et al, "Silicon enhanced carbon nano tube growth on nickel films by chemical vapor deposiiton" Sol. St. Com., 129, 2004, 583-587.*

(Continued)

Primary Examiner — Melvin Mayes
Assistant Examiner — Bijay Saha
(74) Attorney, Agent, or Firm — Knobbe, Martens, Olson & Bear LLP

(57) ABSTRACT

Techniques for forming metal catalyst particles on a metal tip, and nanostructures on a metal tip are provided.

16 Claims, 8 Drawing Sheets

U.S. PATENT DOCUMENTS

| | | |
|---|---|---|
| 2009/0173931 A1 | 7/2009 | Stumbo |
| 2009/0272935 A1 | 11/2009 | Hata et al. |
| 2010/0068406 A1 | 3/2010 | Man |

FOREIGN PATENT DOCUMENTS

| | | |
|---|---|---|
| JP | 2004211213 A | 7/2004 |
| WO | WO 2005/025734 A2 | 3/2005 |

OTHER PUBLICATIONS

Heo, et al., Transmission-type microfocus x-ray tube using carbon nanotube field emitters, Applied Physics Letters, 90, 183109 1-3, published online May 1, 2007.

Kong, et al., Chemical vapor deposition of methane for single-walled carbon nanontubes, Chemical Physics Letters 292, pp. 567-574, Aug. 14, 1998 Elsevier Science.

Hafner, et al., Catalytic growth of single-wall carbon nanotubes from metal particles, Chemical Physics Letters, 296, pp. 195-202, Oct. 30, 1998 Elsevier Science.

Yudasaka, et al., "Specific conditions for Ni catalyzed carbon nanotube growth by chemical vapor deposition," *Appl Phys. Lett.*, vol. 67, No. 17, pp. 2477-2479, Oct. 23, 1995.

Fa-Kuei Tung, et al., Hydrogen plasma enhanced alignment on CNT-STM tips grown by liquid catalyst-assisted microwave plasma-enhanced chemical vapor deposition, *Applied Surface Science*, vol. 254, pp. 7750-7754, 2008.

File History for U.S. Appl. No. 12/196194, for the period of Aug. 21, 2008 to Nov. 22, 2010.

Hongjie Dai, et al., Naontubes as nanoprobes in scanning probe microscopy, Nature, vol. 384, pp. 147-150, Nov. 14, 1996 Nature Publishing Group.

Jae-Hyeok Lee, et al., Fabrication of carbon nanotube AFM probes using the Langmuir-Blodgett technique, *Ultramicroscopy*, vol. 108, pp. 1163-1167, 2008.

Ji-Eun Kim, et al., Use of dielectrophoresis in the fabrication of an atomic force microscope tip with a carbon nanotube: experimental investigation, *Nanotechnology*, vol. 17, pp. 2937-2941, 2006.

Stanislaus Wong, et al., Single-walled carbon nanotube probes for high-resolution nanonstructure imaging, Applied Physics Letters, vol. 73, No. 23, pp. 3465-3467, Dec. 7, 1998 American Institute of Physics.

Sulchek, et al., "High-speed atomic force microscopy in liquid," *Rev. Sci. Instrum.*, vol. 71, No. 5, pp. 2097-2099, May 2000.

File History for U.S. Appl. No. 12/196,094, for the period of Nov. 23, 2010 to Mar. 9, 2011.

* cited by examiner

[Fig. 1]
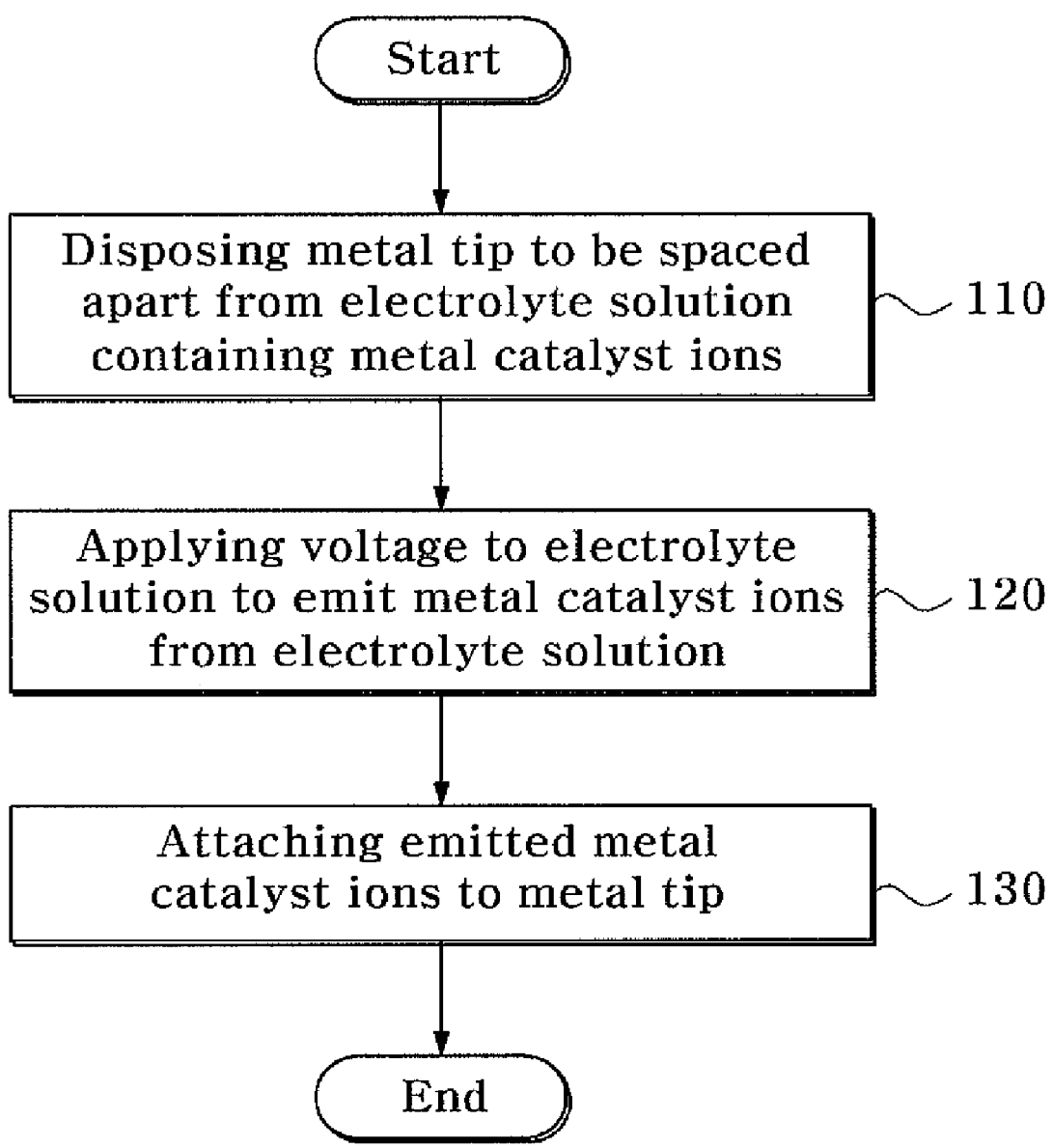

[Fig. 2]
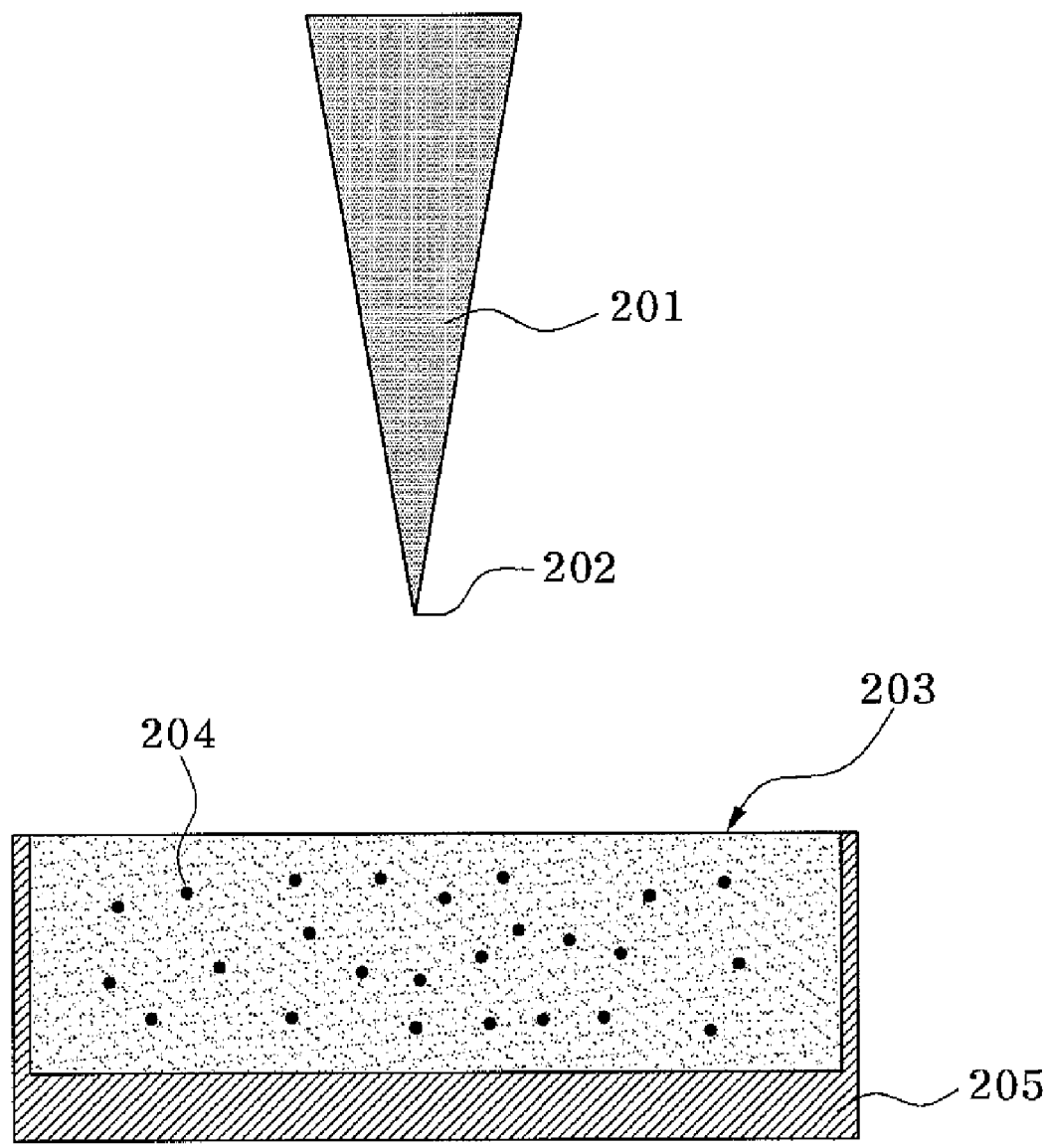

[Fig. 3]
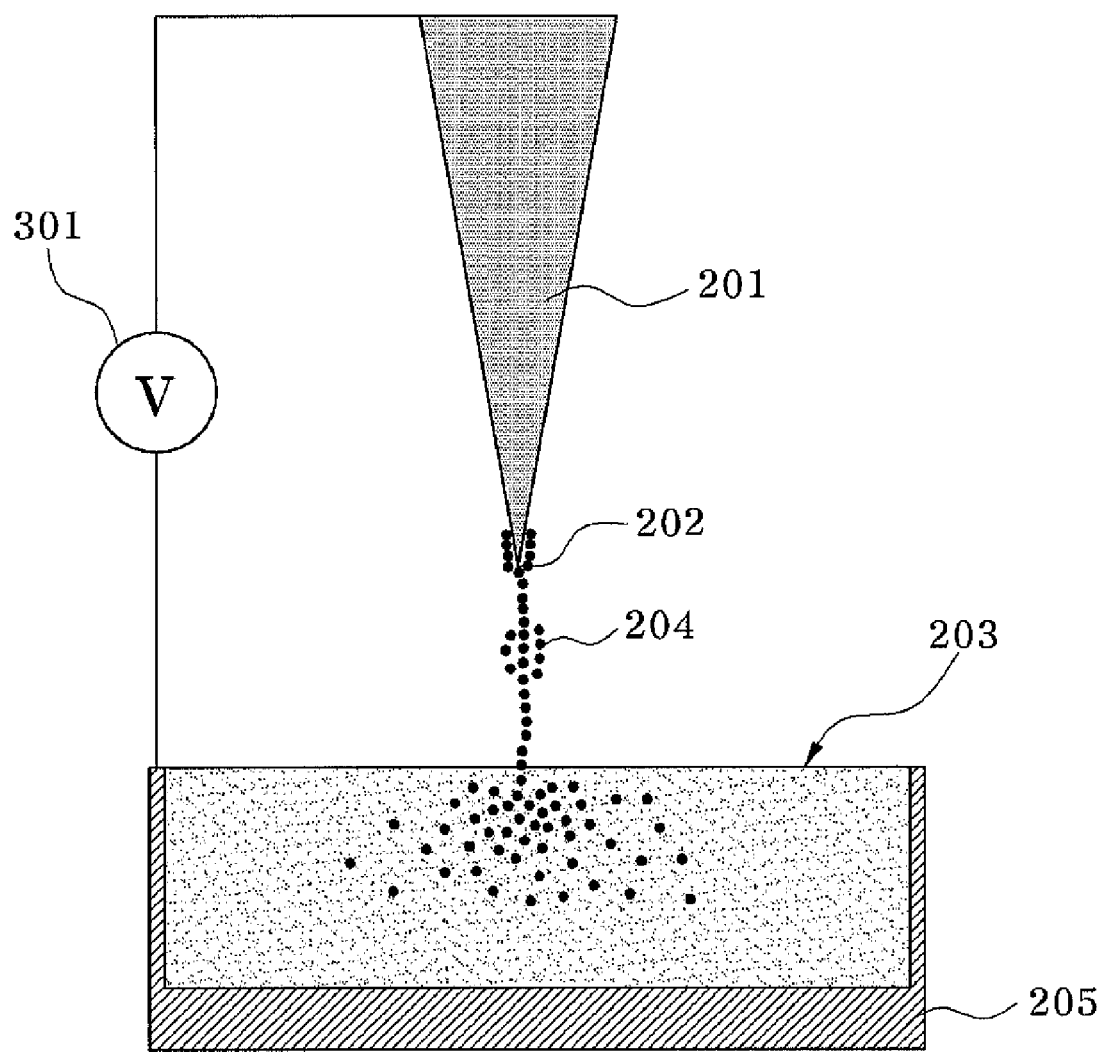

[Fig. 4]
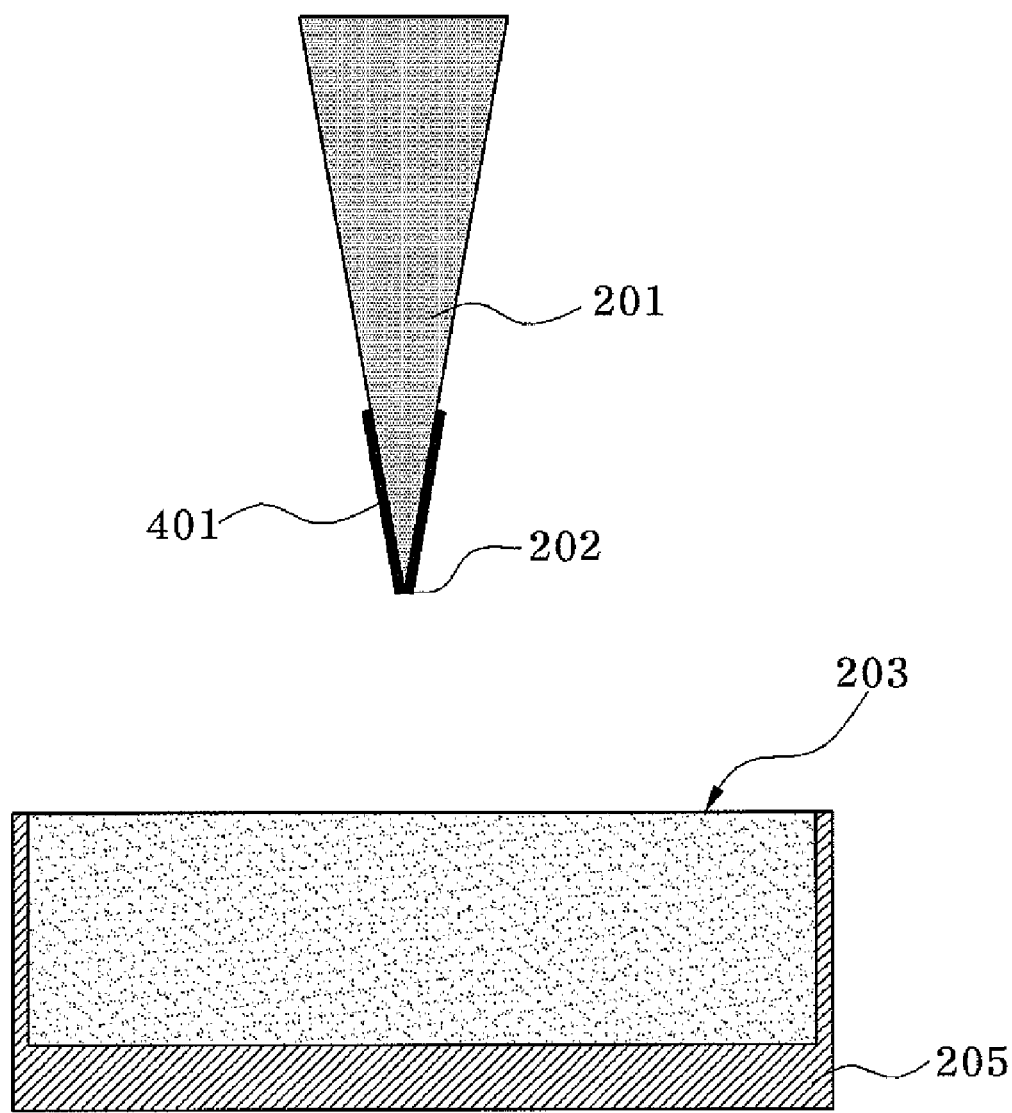

[Fig. 5]
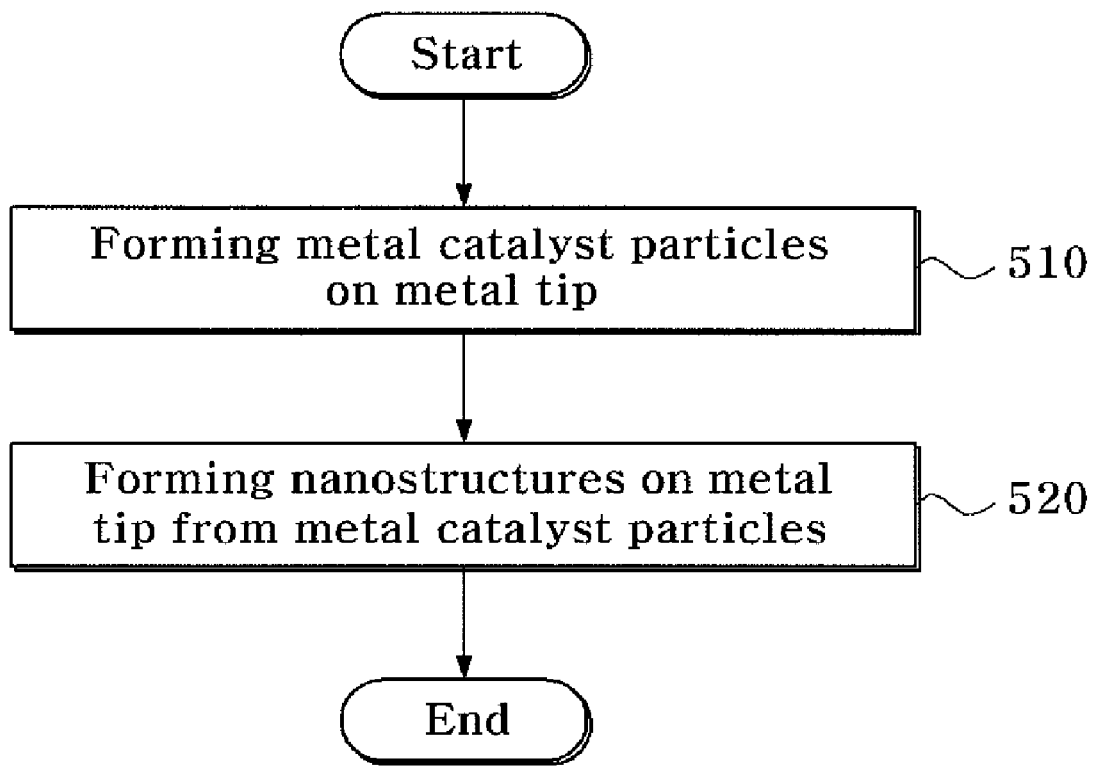

[Fig. 6]
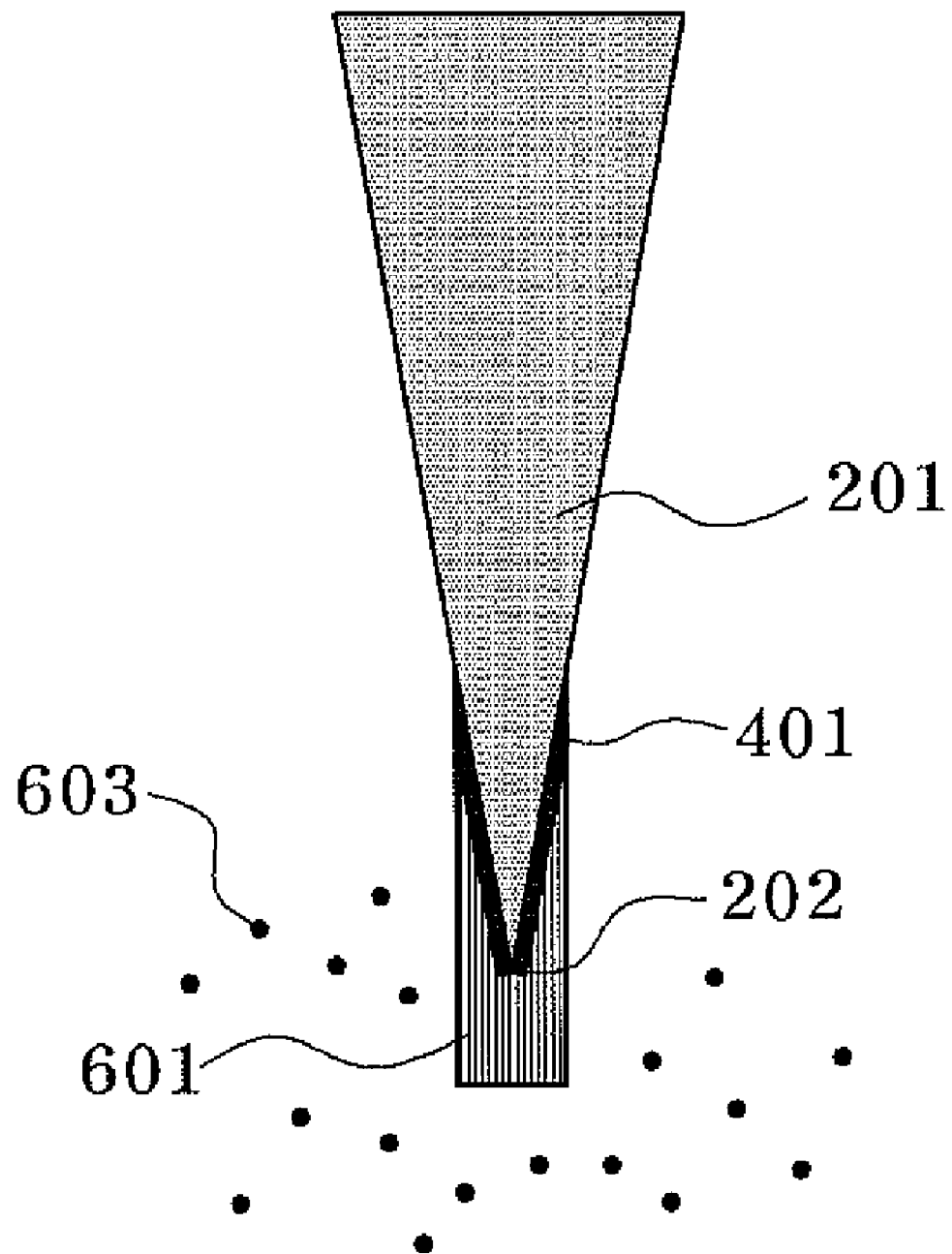

[Fig. 7a]
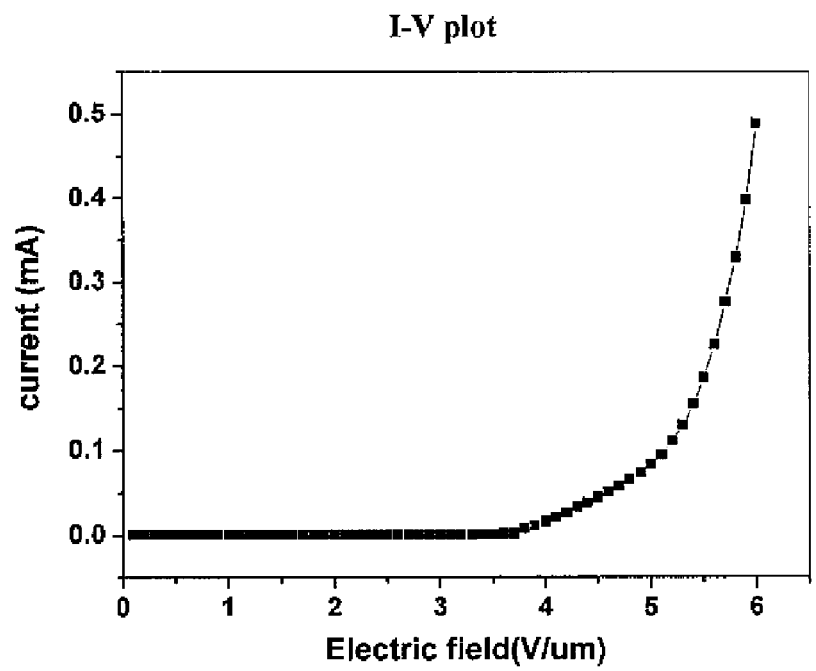
[Fig. 7b]
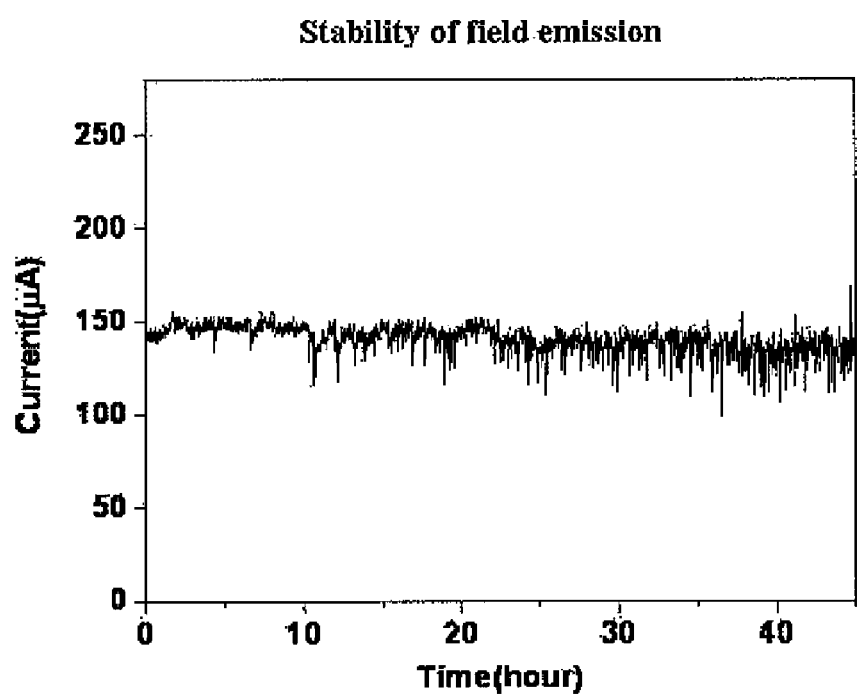

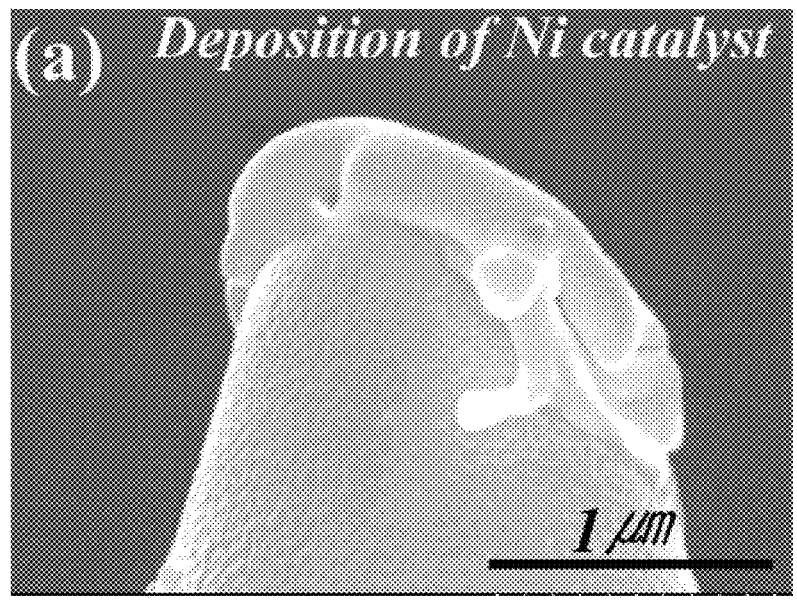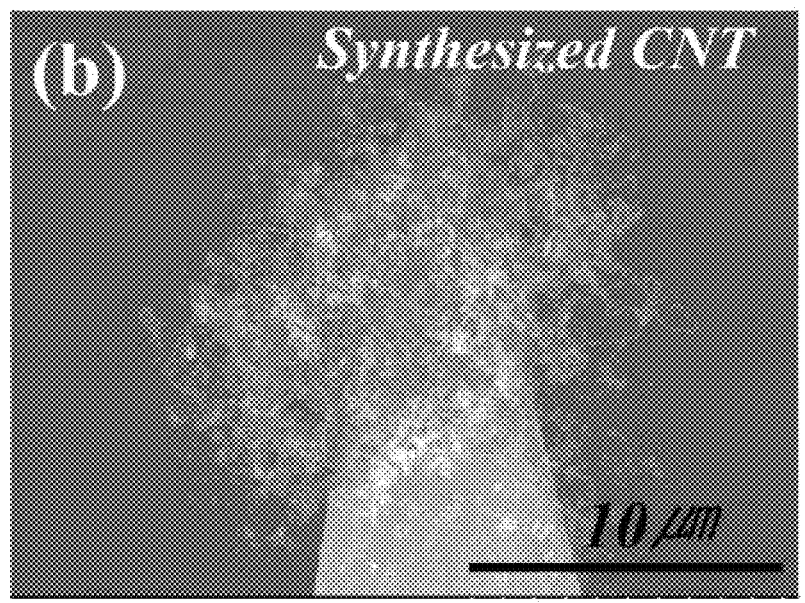
FIGURE 8

US 8,070,929 B2

CATALYST PARTICLES ON A TIP

TECHNICAL FIELD

The described technology relates generally to nanostructures and, more particularly, catalyst particles on a tip.

BACKGROUND

Recently, considerable research has been conducted regarding carbon nanotubes (CNTs) and CNT applications. One of the applications involves applying the CNTs to an electron emitter of a field emission device (FED). Typically, the FED applies an external electric field to a surface of the electron emitter so that electrons on the surface are emitted outward using quantum-mechanical tunneling. CNTs possess good conductivity, a good field enhancement effect, a lower work function than that of metal and good field emission properties. In addition, CNTs possess good chemical resistance properties and good mechanical strength, thus allowing for the manufacture of durable electron emitters.

A method of forming CNTs using Fe and Mo or Fe metal particles as catalysts by a thermal chemical vapor deposition (CVD) method is discussed in Chem. Phys. Lett. 292, 567 (1988) by J. Kong et al and in Chem. Phys. 296, 195 (1998) by J. Hafner et al. More recently, research on a method of forming CNTs on a cathode using various metal catalysts has been conducted. For example, a method of forming multi-walled CNTs on a tungsten tip using a nickel catalyst by a plasma-enhancement CVD method is described by S. H. Heo et al in Applied Phys. Lett. 90, 183109 (2007).

To use CNTs as a field emitter of the FED, it is necessary to form the CNTs around an apex of a cathode where an electric field is concentrated in order for the field emitter to be electrically reliable. Thus, the catalyst particles need to be formed around the apex of the cathode. One drawback is that, at present it is difficult to reliably control the catalyst particles.

SUMMARY

In one embodiment, a method for forming metal catalyst particles on a metal tip comprises disposing a metal tip to be spaced apart from an electrolyte solution containing metal catalyst ions. The method also comprises applying a voltage to the electrolyte solution to emit the metal catalyst ions from the electrolyte solution, and attaching the emitted metal catalyst ions to the metal tip.

In one embodiment, a method for forming nanostructures on a metal tip comprises forming metal catalyst particles on a metal tip, and forming nanostructures on the metal tip from the metal catalyst particles. Forming the metal catalyst particles on the metal tip comprises applying a voltage to an electrolyte solution including metal catalyst ions so that the electrolyte solution emits the metal catalyst ions from the electrolyte solution, and attaching the emitted metal catalyst ions to the metal tip.

The Summary is provided to introduce a selection of concepts in a simplified form that are further described below in the Detailed Description. The Summary is not intended to identify key features or essential features of the claimed subject matter, nor is it intended to be used as an aid in determining the scope of the claimed subject matter.

BRIEF DESCRIPTION OF THE DRAWINGS

FIG. 1 is a flow chart of an illustrative embodiment of a method for forming metal catalyst particles on a metal tip.

FIGS. 2 to 4 are schematic diagrams of an illustrative embodiment of a method for forming metal catalyst particles on a metal tip.

FIG. 5 is a flow chart of an illustrative embodiment of a method for forming nanostructures on a metal tip.

FIG. 6 is a schematic diagram of an illustrative embodiment of a method for forming nanostructures on a metal tip.

FIGS. 7A and 7B show illustrative embodiments of graphs illustrating evaluation results of the stability of the field emission and the I-V properties of a field emission emitter.

FIG. 8 is SEM images of tungsten tips prepared using the methods disclosed herein: (A) Ni catalyst locally formed on the tungsten tip by field-induced ion emission from Ni electrolyte, and (B) CNT formed on Ni catalyst.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes made be made, without departing from the spirit or scope of the subject matter presented here. It will be readily understood that the components of the present disclosure, as generally described herein, and illustrated in the Figures, can be arranged, substituted, combined, and designed in a wide variety of different configurations, all of which are explicitly contemplated and make part of this disclosure.

It will also be understood that when an element or layer is referred to as being "on," another element or layer, the element or layer may be directly on the other element or layer or intervening elements or layers may be present. As used herein, the term "and/or" may include any and all combinations of one or more of the associated listed items.

Method of Forming Metal Catalyst Particles on Metal Tip

FIG. 1 is a flow chart of an illustrative embodiment of a method for forming metal catalyst particles on a metal tip. Referring to FIG. 1, beginning in block 110, a metal tip is disposed to be spaced apart from an electrolyte solution. For example, the metal tip may be disposed over the electrolyte solution. The electrolyte solution includes metal catalyst ions. In block 120, a power source, such as an external power source, applies a voltage to the electrolyte solution, thus causing the electrolyte solution to emit the metal catalyst ions. In block 130, the emitted metal catalyst ions are attached to the metal tip as a result of an electric field formed around the metal tip. As a result, the metal catalyst particles form on the metal tip.

FIGS. 2 to 4 are schematic diagrams of an illustrative embodiment of a method for forming the metal catalyst particles on the metal tip. Referring to FIG. 2, a metal tip 201 having an apex 202 is disposed to be spaced apart from an electrolyte solution 203. The metal tip 201, for example, may be formed of a metal such as tungsten, nickel, aluminum, molybdenum, tantalum or niobium, or an alloy thereof. In one embodiment the apex 202 on the metal tip 201 may be formed by electrochemically etching a metal wire within an electrolyte solution. For example, a tungsten wire may be electrochemically etched within a sodium hydroxide solution or a potassium hydroxide solution to form a tungsten tip with an apex. For another example, an aluminum wire may be electrochemically etched within a hydrogen chloride solution mixed with a hydro sulfuric acid to form an aluminum tip with an apex. In another embodiment, the apex 202 on the metal tip 201 may be formed by mechanically grinding a metal wire.

The electrolyte solution 203 that includes metal catalyst ions 204 may be provided within an electrode container 205. The metal catalyst ions 204 may be formed from metal catalysts in the electrolyte solution 203. In one embodiment, the metal catalyst ions 204 may be metal cations having positive charges when the metal catalysts discharge some electrons thereof into the electrolyte solution 203. In another embodiment, the metal catalyst ions 204 may be metal anions having negative charges when the metal catalysts obtain some electrons from the electrolyte solution 203. The metal catalyst ions 204, for example, may include nickel ions, cobalt ions, molybdenum ions, iron ions, etc., or a combination thereof.

Referring to FIG. 3, an external power source 301 applies a voltage to the electrolyte solution 203, which causes the electrolyte solution 203 to emit the metal catalyst ions 204 outward from the electrolyte solution 203. In one embodiment, the external power source 301 is connected between the metal tip 201 and the electrode container 205 to apply the voltage to the electrolyte solution 203. In one embodiment, when the metal catalyst ions 204 have positive charges, the voltage may be applied to allow the metal tip 201 to have a negative potential and the electrolyte solution 203 to have a positive potential. In another embodiment, when the metal catalyst ions 204 have negative charges, the voltage may be applied to allow the metal tip 201 to have a positive potential and the electrolyte solution 203 to have a negative potential.

The voltage applied to the electrolyte solution 203 generates an electrostatic force. The generated electrostatic force may cause the metal catalyst ions 204 to gather toward the surface of the electrolyte solution 203. The metal catalyst ions 204 gathered toward the surface of the electrolyte solution 203 may exhibit electrostatic repulsion against each other. At this time, when a voltage exceeding a threshold voltage is applied, the metal catalyst ions 204 can overcome the surface tension of the electrolyte solution 203 so that the metal catalyst ions 204 are emitted from the surface of the electrolyte solution 203. The threshold voltage means a critical voltage applied into the electrolyte solution 203, which is an upper limit voltage that metal catalyst ions 650 can exist in the electrolyte solution 203 in spite of the electrostatic repulsion against each other and the electrostatic repulsion with the electrolyte solution 203.

The electric field formed around the metal tip 201 by the voltage induces the metal catalyst ions 204 emitted from the electrolyte solution 203 toward the metal tip 201. In one embodiment, the electric field is concentrated on the apex 202 of the metal tip 201, and the emitted metal catalyst ions 204 may become attached to the apex 202 of the metal tip 201. The attached metal catalyst ions 204 can receive electrons from the metal tip 201 or give electrons to the metal tip 201 so that the metal catalyst ions 204 are reduced or oxidized to become metal catalyst atoms on the metal tip 201.

Referring to FIG. 4, metal catalyst particles 401 are formed on the metal tip 201. The metal catalyst atoms reduced or oxidized on the metal tip 201 bond to each other to form the metal catalyst particles 401. The metal catalyst particles 401 may form on the metal tip 201 in the form of a thin film. In one embodiment, the metal catalyst particles 401 may form around the apex 202 of the metal tip 201 where the electric field is concentrated. The size of the metal catalyst particles 401 may be determined by adjusting an amount of the metal catalyst ions 204 moving from the electrolyte solution 203 to the metal tip 201. The amount of the metal catalyst ions 204 moving from the electrolyte solution 203 to the metal tip 201 may be monitored by measuring the amount of electric charge generated by the metal catalyst ions 204, and thus may be adjusted by changing a voltage applied into the electrolyte solution 203 or a process time that the applied voltage maintains. Therefore, the metal catalyst particles 401 formed on the metal tip 201 to be controlled to a desired size.

As described above, by delivering metal catalyst ions using the electric field, the size of metal catalyst particles may be readily controlled on a metal tip. The metal catalyst particles may be formed around the apex of the metal tip where the electric field is concentrated. In addition, the method of forming the metal catalyst particles as described above in one or more embodiments allows nanostructures to be formed around the apex of the metal tip, as will be further described below.

Method of Forming Nanostructures on Metal Tip

FIG. 5 is a flow chart of an illustrative embodiment of a method for forming nanostructures on a metal tip. Referring to FIG. 5, beginning in block 510, metal catalyst particles are formed on a metal tip. The metal catalyst particles may be formed on the metal tip as described above with reference to FIGS. 1 to 4. Therefore, a detailed description of a method of forming the metal catalyst particles on the metal tip is omitted for simplicity.

In block 520, nanostructures are formed from the metal catalyst particles on the metal tip. The nanostructures may be formed from the metal catalyst particles using, for example, a chemical vapor deposition (CVD) method or any of a variety of well-known evaporation methods.

FIG. 6 is a schematic diagram of an illustrative embodiment of a method for forming nanostructures on a metal tip. The nanostructures, for example, may include carbon nanotubes, nanowires or nanorods. A method for forming the carbon nanotubes as one example of the nanostructures will now be described. Referring to FIG. 6, carbon nanotubes 601 are formed from the metal catalyst particles 401 on the surface of the metal tip 201 described with reference to FIG. 4. In one embodiment, the carbon nanotubes 601 may be formed by the CVD method using, for example, heat, plasma or microwave as an energy source. In the CVD method, a reaction gas 603 including hydrocarbon is introduced onto the metal catalyst particles 401. The hydrocarbon may include carbon monoxide, acetylene, ethylene, ethane, methane, propane, or a combination thereof. The reaction gas 603 including the hydrocarbon is dissolved on the metal catalyst particles 401 by, for example, the heat, the plasma or the microwave. Carbon atoms separated from the hydrocarbon in the dissolved reaction gas 603 diffuse into the metal catalyst particles 401 and the carbon atoms are filled within the metal catalyst particles 401. When the carbon atoms are filled beyond the solubility of carbon in the metal catalyst particles 401, precipitation of the carbon atoms occurs. Due to the precipitation, the carbon atoms are extracted from the metal catalyst particles 401. At this time, the extracted carbon atoms are rearranged on the interface with the metal catalyst particles 401. The rearranged carbon atoms grow from the interface to form the carbon nanotubes 601.

The carbon nanotubes 601 may be formed by base growth or tip growth. As illustrated in FIG. 6, the base growth allows the carbon nanotubes 601 to be formed above the top surface of the metal catalyst particles 401 while the metal catalyst particles 401 are attached to the metal tip 201. Alternatively, the tip growth allows the carbon atoms to be diffused from the top surface into the bottom surface of metal catalyst particles and then to be extracted from the bottom surface of the metal catalyst particles, thereby forming carbon nanotubes below the metal catalyst particles. The metal catalyst particles 401 may remain on the carbon nanotubes 601 after the carbon nanotubes 601 are formed from the metal catalyst particles 401.

In one embodiment, an electrode (not shown) is disposed to be spaced apart from the metal tip 201, and an external voltage may be applied between the metal tip 201 and the electrode while the carbon nanotubes 601 are being formed on the metal tip 201 by the CVD method. An electric field generated by the external voltage may prevent the carbon nanotubes 601 from randomly growing on the metal tip 201. The electric filed may interact with the carbon nanotubes 601 growing on the metal tip 201. The electric field may change the internal dipole polarity of the carbon nanotubes 601 and generate torque and force to align the carbon nanotubes 601. Accordingly, the electric field may change the growth direction of the carbon nanotubes 601 on the metal tip 201, thus allowing the carbon nanotubes 601 to be aligned along the electric filed. As illustrated in FIG. 6, the carbon nanotubes 601 may be aligned substantially parallel to a longitudinal direction of the metal tip 201.

The nanostructures other than the carbon nanotubes may be formed by the similar method as the method of forming the carbon nanotubes, described with reference to FIG. 6. That is, a predetermined source gas corresponding to the nanostructures may be provided and dissolved on metal catalyst particles, and the nanostructures may be formed by reactions between the dissolved source gas and the metal catalyst particles. In one embodiment, silicon carbide nanorods may be formed by a CVD method using a vaporized $C_6H_{18}Si_2$ gas as the source gas and iron particles as the metal catalyst particles. In another embodiment, silicon oxide nanowires may be formed by an evaporation method using a vaporized SiO gas as the source gas and iron particles as the metal catalyst particles.

Hereinafter, electrical properties of nanostructures and a field emission emitter including the nanostructures of the present disclosure will be described in detail with respect to specific examples, however, these examples are only provided for better understanding of the present disclosure and not intended to limit the scope of the present disclosure.

EXAMPLES

Formation of Metal Catalyst Particles and Carbon Nanotubes on Metal Tip

A voltage of 30V was applied to a tungsten wire within a potassium hydroxide solution of 1.5 mol/L to electrochemically etch the tungsten wire, thereby forming a tungsten tip with an apex. An electrolyte solution containing nickel ions as metal catalyst ions was disposed to be spaced apart from the tungsten tip by 50 μm. The voltage was then increased and applied at a voltage rate of 10V/sec between the tungsten tip and the electrolyte solution to extract nickel catalyst ions from the electrolyte solution, and the extracted nickel catalyst ions were attached to the tungsten tip to form nickel catalyst particles. Acetylene ($C_2H_2$) of 40 sccm was supplied to the tungsten tip where the nickel catalyst particles are formed for 10 minutes at 700° C. Accordingly, the carbon nanotubes were formed on the tungsten tip, and the field emission emitter having the carbon nanotubes was fabricated.

Measurement on Electrical Property of Field Emission Emitter

I-V properties of the field emission emitter having the carbon nanotubes and stability of the field emission were evaluated. An electric field of 1 to 6 V/μm was formed in the tungsten tip, and a current generated by electrons emitted from the carbon nanotubes of the tungsten tip was measured. In addition, the electric field corresponding to about 5.2 V/μm was constantly applied to the tungsten tip for about 50 hours, and a current generated by the carbon nanotubes was measured over time.

Evaluation

FIGS. 7A and 7B are graphs illustrating evaluation results of the stability of the field emission and the I-V properties of the field emission emitter of the present example. Referring to FIG. 7A, when an electric field of about 4 V/μm or higher is applied, the current caused by electrons emitted through the carbon nanotubes increases drastically. Referring to FIG. 7B, when an electric field of about 5.2 V/μm is constantly applied to the tungsten tip, a current of about 150 μA is stably generated for about 50 hours. Therefore, the field emission emitter having the carbon nanotubes formed on the metal tip according to the method of the present example shows stable current emitting properties.

As described above, according to some embodiments, an electric field may be applied to form metal catalyst particles around an apex of a metal tip. Since nanostructures are formed from the positions where the metal catalyst particles are disposed, the nanostructures may be formed around the apex of the metal tip by a simple method at a low cost compared to the related art. In addition, an amount of electric charges of metal catalyst ions moving from an electrolyte solution to the metal tip can be adjusted to control sizes of the metal catalyst particles. Therefore, the nanostructures having various diameters and densities can be produced from the metal catalyst particles of which the sizes were controlled on the metal tip.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for forming nanostructures on a metal tip, comprising:
   disposing the metal tip to be spaced apart from an electrolyte solution, the electrolyte solution containing metal catalyst ions;
   applying a voltage to the electrolyte solution to emit the metal catalyst ions from the electrolyte solution, wherein the metal tip is spaced apart from the electrolyte solution while applying the voltage;
   attaching the emitted metal catalyst ions to the metal tip to form metal catalyst particles on the metal tip; and
   providing a reaction gas to the metal catalyst particles on the metal tip to form nanostructures on the metal tip.

2. The method of claim 1, wherein the metal tip is formed by electrochemically etching a metal wire within a metal hydroxide solution.

3. The method of claim 2, wherein the metal hydroxide solution comprises potassium hydroxide or sodium hydroxide.

4. The method of claim 1, wherein the metal tip is formed of at least one material selected from the group consisting of tungsten, nickel, aluminum, molybdenum, tantalum and niobium.

5. The method of claim 1, wherein the metal catalyst ions comprise at least one ion selected from the group consisting of nickel ions, cobalt ions, molybdenum ions and iron ions.

6. The method of claim 1, wherein attaching the emitted metal catalyst ions to the metal tip comprises reducing or oxidizing the emitted metal catalyst ions into metal catalyst particles on the metal tip.

7. The method of claim 1, wherein the voltage is applied to allow the electrolyte solution to have a positive potential and the metal tip to have a negative potential.

8. The method of claim 1, wherein the voltage is applied to allow the electrolyte solution to have a negative potential and the metal tip to have a positive potential.

9. The method of claim 1, wherein attaching the emitted metal catalyst ions to the metal tip comprises controlling a size of the metal catalyst particles by adjusting the voltage and/or time the voltage is applied.

10. The method of claim 1, wherein the electrolyte solution is disposed within a container.

11. The method of claim 1, wherein the nanostructures comprise carbon nanotubes.

12. The method of claim 11, wherein the reaction gas comprises a hydrocarbon.

13. The method of claim 12, wherein the hydrocarbon is selected from the group consisting of carbon monoxide, acetylene, ethane, methane, propane, and a combination thereof.

14. The method of claim 1, wherein an electrode is disposed apart from the metal tip and a voltage is applied between the metal tip and the electrode while the nanostructures are being formed.

15. The method of claim 1, wherein the reaction gas comprises SiO and/or $C_6H_{18}Si_2$.

16. The method of claim 1, wherein heat, plasma radiation and/or microwave radiation are applied while the nanostructures are being formed.

* * * * *

UNITED STATES PATENT AND TRADEMARK OFFICE
CERTIFICATE OF CORRECTION

| | | |
|---|---|---|
| PATENT NO. | : 8,070,929 B2 | Page 1 of 1 |
| APPLICATION NO. | : 12/196092 | |
| DATED | : December 6, 2011 | |
| INVENTOR(S) | : Kim et al. | |

It is certified that error appears in the above-identified patent and that said Letters Patent is hereby corrected as shown below:

On the Cover Page, item (56), under "OTHER PUBLICATIONS", in Column 2, Line 2, delete "deposiiton"" and insert -- deposition" --, therefor.

On Page 2, item (56), under "OTHER PUBLICATIONS", in Column 1, Line 5, delete "nanontubes," and insert -- nanotubes, --, therefor.

On Page 2, item (56), under "OTHER PUBLICATIONS", in Column 1, Line 11, delete "Appl" and insert -- Appl. --, therefor.

On Page 2, item (56), under "OTHER PUBLICATIONS", in Column 2, Line 7, delete "Naontubes" and insert -- Nanotubes --, therefor.

On Page 2, item (56), under "OTHER PUBLICATIONS", in Column 2, Line 17, delete "nanonstructure" and insert -- nanostructure --, therefor.

On Page 2, item (56), under "OTHER PUBLICATIONS", in Column 2, Line 21, delete "lnstrum.," and insert -- Instrum., --, therefor.

In Column 1, Line 18, delete "metal" and insert -- metal, --, therefor.

In Column 1, Line 37, delete "present" and insert -- present, --, therefor.

In Column 2, Line 62, delete "embodiment" and insert -- embodiment, --, therefor.

Signed and Sealed this
Twenty-fifth Day of September, 2012

David J. Kappos
*Director of the United States Patent and Trademark Office*